(12) United States Patent
Kester

(10) Patent No.: US 8,960,322 B2
(45) Date of Patent: Feb. 24, 2015

(54) SCRAPER BLADE ASSEMBLY FOR PLANTER GAUGE WHEELS

(71) Applicant: Philip C. Kester, East Moline, IL (US)

(72) Inventor: Philip C. Kester, East Moline, IL (US)

(*) Notice: Subject to any disclaimer, the term of this patent is extended or adjusted under 35 U.S.C. 154(b) by 0 days.

(21) Appl. No.: 13/750,900

(22) Filed: Jan. 25, 2013

(65) Prior Publication Data

US 2013/0186658 A1 Jul. 25, 2013

Related U.S. Application Data

(60) Provisional application No. 61/590,800, filed on Jan. 25, 2012.

(51) Int. Cl.
*A01B 15/16* (2006.01)
*A01B 15/00* (2006.01)
*A01C 5/06* (2006.01)
*A01B 35/20* (2006.01)
*A01C 7/20* (2006.01)

(52) U.S. Cl.
CPC ............. *A01B 15/00* (2013.01); *A01C 5/062* (2013.01); *A01B 35/20* (2013.01); *A01C 5/064* (2013.01); *A01C 7/203* (2013.01)
USPC .......................................... 172/558; 172/610

(58) Field of Classification Search
CPC ........ A01C 5/064; A01C 7/203; A01B 15/16; A01B 19/10
USPC .......... 172/558–566, 606, 610; 404/103, 129; 15/256.51; 280/855
See application file for complete search history.

(56) References Cited

U.S. PATENT DOCUMENTS

| | | | | |
|---|---|---|---|---|
| 773,595 | A * | 11/1904 | Robinson | 280/855 |
| 1,761,262 | A * | 6/1930 | Guth | 280/855 |
| 1,924,626 | A * | 8/1933 | Roddel | 280/855 |
| 1,933,679 | A * | 11/1933 | Nicewander et al. | 280/855 |
| 2,571,285 | A * | 10/1951 | Oehler | 280/856 |
| 4,858,699 | A * | 8/1989 | Poltrock | 172/558 |
| 5,269,380 | A * | 12/1993 | Lofquist et al. | 172/558 |

(Continued)

FOREIGN PATENT DOCUMENTS

EP 345899 A1 * 12/1989 ............. A01B 29/04

OTHER PUBLICATIONS

R K Products, Inc., Instructions for Installing RKP Mud Scrapers on John Deere and Kinze and Similar Planters, AI-1272, Revised Jan. 7, 2013, East Moline, Illinois.

(Continued)

*Primary Examiner* — Robert Pezzuto
*Assistant Examiner* — Jessica H Lutz
(74) *Attorney, Agent, or Firm* — Jeffrey L. Thompson; Thompson & Thompson, P.A.

(57) ABSTRACT

A scraper assembly for removing mud and moist soil from the gauge wheels of an agricultural planter includes a support rod attached to a hub of a gauge wheel arm, a clamp structure attached to an end portion of the support rod, and a scraper blade attached to the clamp structure. An axis of the end portion of the support rod is approximately perpendicular to and intersects with an axis of rotation of the gauge wheel. The scraper blade is mounted approximately perpendicular to the outer surface of the gauge wheel and is angled approximately 45 degrees from the sides of the gauge wheel. The scraper blade has a curved profile along its length that substantially matches an outer profile of the outer surface of the gauge wheel when the scraper blade is properly adjusted.

22 Claims, 6 Drawing Sheets

(56) References Cited

U.S. PATENT DOCUMENTS

| | | |
|---|---|---|
| 5,297,497 A | 3/1994 | Schmidt |
| 5,431,233 A | 7/1995 | Schmidt |
| 5,443,125 A | 8/1995 | Clark et al. |
| 5,884,711 A | 3/1999 | Shoup |
| 7,730,962 B1 | 6/2010 | Kester |

OTHER PUBLICATIONS

R K Products, Inc., Gauge Wheel Rotary Mud Scraper, Feb. 11, 2001, East Moline, Illinois.

R K Products, Inc., Instructions for Installing the RKP Mud Scrapers, AI-1270, Apr. 30, 2003, East Moline, Illinois.

R K Products, Inc., Gauge Wheel Mud Scrapers for John Deere and Kinze Planters, Jan. 9, 2004, East Moline, Illinois.

R K Products, Inc., Instructions for Installing RKP Mud Scrapers on John Deere and Kinze Planters, AI-1270, Aug. 15, 2005, East Moline, Illinois.

R K Products, Inc., Gauge Wheel Mud Scrapers for John Deere and Kinze Planters, Aug. 23, 2005, East Moline, Illinois.

\* cited by examiner

SCRAPER BLADE ASSEMBLY FOR PLANTER GAUGE WHEELS

RELATED APPLICATIONS

This application claims priority of U.S. Provisional Application No. 61/590,800 filed on Jan. 25, 2012. The entire content of this prior application is incorporated herein by reference.

BACKGROUND OF THE INVENTION

1. Field of the Invention

The present invention relates generally to agricultural planters. In particular, the present invention relates to scraper systems for gauge wheels of agricultural planters.

2. Description of the Related Art

Scrapers have proven to be a valuable tool in removing mud and moist soil from planter gauge wheels and for preventing a buildup of moist soil mixed with trash. This is frequently caused by the application of liquid fertilizer just ahead of the gauge wheel. The fertilizer is generally dropped into a furrow formed by a coulter. This results in moist soil being deposited on the surface by the coulter, and then the moist soil sticks to the gauge wheel tire along with trash. A build up on the tire affects the uniformity of planting depth and the uniformity of emergence, which agronomists have determined to be a major factor in yields.

Most scraper blades on the market are made of steel. They are held close to or against the tire surface of the gauge wheel. The scraping edge of the blades generally have a scalloped shape similar to a tire profile. At least one manufacturer provides a flexible plastic blade to improve the contact between the blade and tire.

Blades are usually placed so that the scraping edge is basically parallel to the axis of rotation of the gauge wheel. The plane of the blade is generally leaned away from the unscraped tire surface to allow the scraping edge to fit the tire profile closer and to more effectively deflect the mud or buildup away from the tire. Some scrapers can be adjusted in their own plane to improve the contact between the blade and tire.

The Applicant previously developed an adjustable scraper assembly having a triple adjusting clamp, which is described in U.S. Pat. No. 7,730,962 B1 and illustrated in FIGS. 1 to 3 of the present application. The triple adjusting clamp 100 shown in FIGS. 1 and 2 allows the scraper blade 101 to be infinitely adjustable. The content of the '962 patent is incorporated herein by reference to provide additional background information for the present application.

To achieve optimum performance, scraper blades must be positioned for minimum clearance or maximum contact with the gauge wheel tire. The purpose is to minimize void areas between the blade and the tire as these will allow small pieces of leaves and stems to bend over the edge of the scraper and accumulate. This is termed "hair pinning." Sometimes the accumulation can be enough that the scraper no longer functions. Excessive pressure between the blade and wheel due to trash build up can prevent the wheel from turning.

However, setting the blade close to the tire almost assures that the blade will rub the tire, at least intermittently. This introduces the possibility of two other problems. The first comes about because gauge wheel tires generally are not very accurate. There almost always is a high spot or hump in the surface of the tire. When the scraping edge of the scraper blade is approximately horizontal across the width of the tire, this hump will contact the blade along its entire width which requires significant energy to push the tire past the scraper blade. The second possible problem is that the scraping edge could gouge into the surface of the tire.

The result would be that the gauge wheel would stop turning or the support rod would slip at both the top and bottom clamping points and the blade would swing rearward.

Complicating the situation is the fact that there are at least three different gauge wheel tire profiles currently being manufactured, and additional tire profiles used on earlier planters.

There is a need in the industry for an improved scraper system for gauge wheels for agricultural planters.

SUMMARY OF THE INVENTION

An object of the present invention is to provide an improved scraper system for planter gauge wheels that solves the problems with the prior art described above.

Further objects of the present invention are to provide a scraper blade system that: is easy to attach to existing planters; is easy to adjust to an optimum mounting position; is tolerant of trash conditions in a field; provides improved trash clearing and reduces voids in which trash can accumulate; allows greater pressure between the blade and tire without gouging the tire; and efficiently handles mud and debris scraped from the gauge wheel surface by deflecting the mud and debris outwardly away from the furrow and the path of the closing wheels.

To accomplish these and other objects of the present invention, an improved scraper blade assembly is provided for removing mud and moist soil from the gauge wheels of an agricultural planter. The scraper blade assembly includes a support rod attached to a hub of a gauge wheel arm, a clamp structure attached to an end portion of the support rod, and a scraper blade attached to the clamp structure. An axis of the end portion of the support rod is approximately perpendicular to and intersects with an axis of rotation of the gauge wheel. The scraper blade is mounted approximately perpendicular to the outer surface of the gauge wheel and is angled approximately 45 degrees from the sides of the gauge wheel. The scraper blade has a curved profile along its length that substantially matches an outer profile of the outer surface of the gauge wheel when the scraper blade is properly adjusted.

According to one aspect of the present invention, a scraper assembly is provided for use with a planter gauge wheel having an axis of rotation and an outer circumferential surface for engaging the ground, the scraper assembly comprising: a mounting bracket; a support rod having a first end portion attached to the mounting bracket and a second end portion having an axis that is approximately perpendicular to and intersects with the axis of rotation of the gauge wheel; a clamp structure attached to the second end portion of the support rod, the clamp structure being adjustable linearly along and rotatably about the second end portion of the support rod; and a scraper blade attached to the clamp structure by a fastener that allows pivotal adjustment about an axis of the fastener, the scraper blade having a scraping edge positioned close to or against the outer surface of the gauge wheel.

According to another aspect of the present invention, an agricultural planter is provided, comprising: a planter frame; a gauge wheel arm having a hub pivotally attached to the planter frame; a gauge wheel assembly attached to the gauge wheel arm, the gauge wheel assembly comprising a gauge wheel having an axis of rotation, and an outer circumferential surface for engaging the ground; and an adjustable scraper assembly having a scraping edge positioned close to or against the outer surface of the gauge wheel. The adjustable scraper assembly comprises: a mounting bracket attached to the hub of the gauge wheel arm; a support rod having a first end portion attached to the mounting bracket and a second end portion located adjacent to the outer surface of the gauge wheel, the second end portion having an axis that extends approximately perpendicular to the axis of rotation of the gauge wheel; a clamp structure attached to the second end portion of the support rod; and a scraper blade comprising the scraping edge attached to the clamp structure. The clamp structure allows sliding adjustment along the support rod and pivotal adjustment about the support rod, and the scraper blade is attached to the clamp structure with a fastener that allows pivotal adjustment about an axis of the fastener.

Numerous other objects of the present invention will be apparent to those skilled in this art from the following description wherein there is shown and described an example embodiment of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A scraper blade assembly for planter gauge wheels according to an embodiment of the present invention will now be described with reference to FIGS. 4 to 8 of the accompanying drawings.

The scraper blade assembly has been developed for scraping the outer circumferential surfaces of planter gauge wheel tires. However, it should be understood that the same structure can be used for scraping gauge wheels that are not covered by tires (e.g., metal wheels designed to operate without tires). The phrases "gauge wheel" and "gauge wheel tire" are used interchangeably throughout this application to refer to the structures that are scraped by the scraper assembly.

Figure 5:
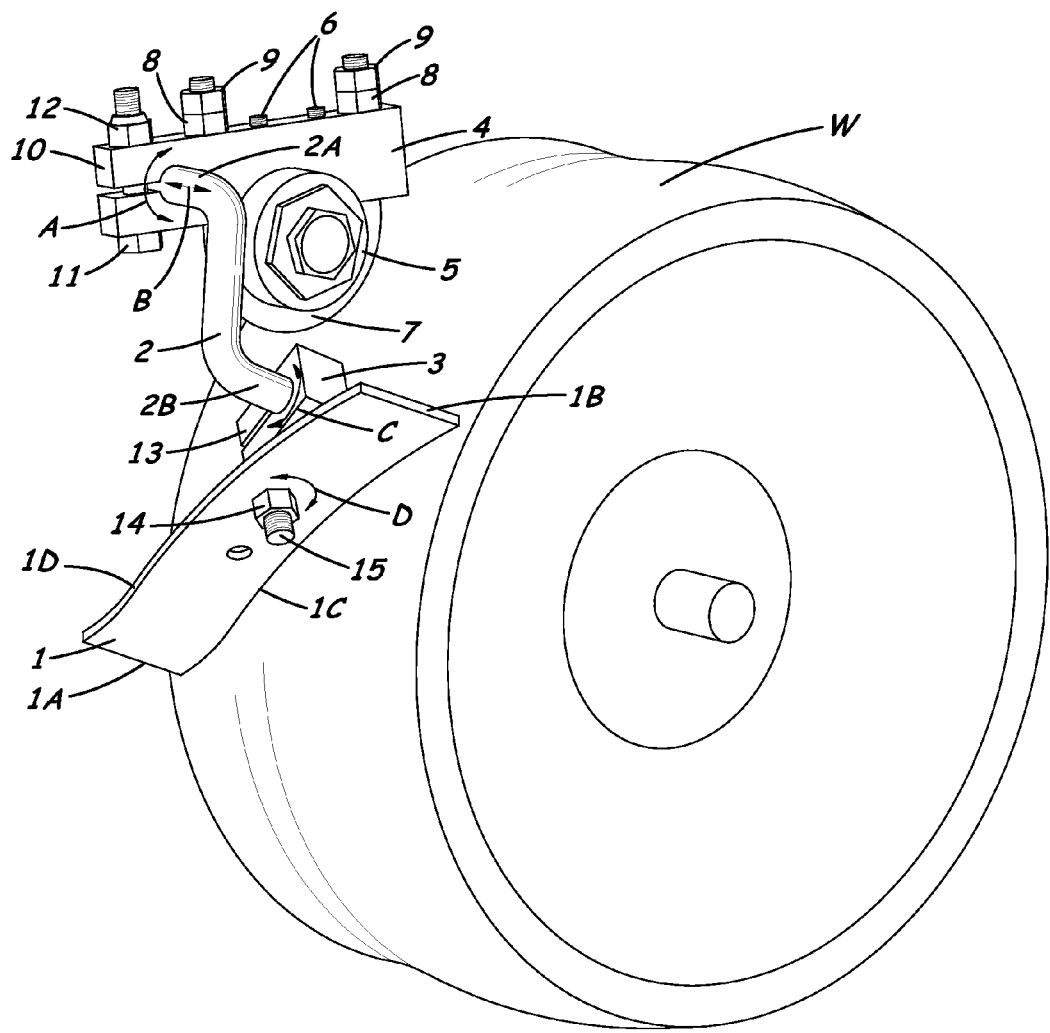
FIG. 5 is a perspective view of a gauge wheel scraper assembly according to the present invention.
Figure 7:
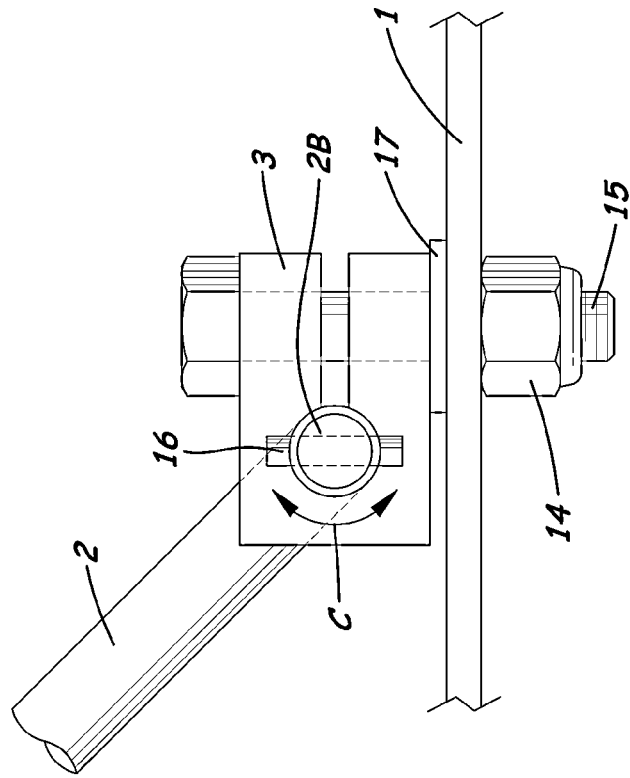
FIG. 7 is another detail side view of a portion of the gauge wheel scraper assembly shown in FIG. 5, as viewed in a direction parallel to the end portion of the support rod of the assembly.
Figure 6:
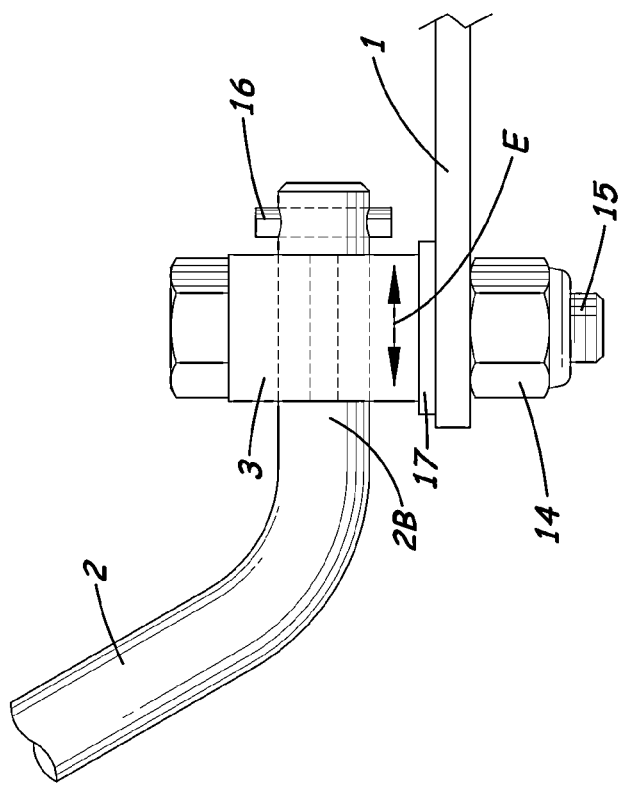
FIG. 6 is a detail side view of a portion of the gauge wheel scraper assembly shown in FIG. 5, as viewed in a direction perpendicular to an end portion of a support rod of the assembly.

A scraper blade assembly according to the present invention is illustrated in FIG. 5, together with a gauge wheel arm hub 5 and a gauge wheel assembly W. The gauge wheel arm hub 5 is pivotally attached to a planter frame of an agricultural planter. A gauge wheel arm (not shown) has one end connected to the hub 5 and another end supporting the gauge wheel W. The gauge wheel arm is pivotally mounted to the planter frame via the hub 5 for rotation about an axis that extends through the center of the hub 5.

The scraper blade assembly is mounted to the gauge wheel arm hub 5 so that the scraper blade assembly moves together with the gauge wheel W relative to the planter frame, while maintaining its position relative to the gauge wheel W. A mounting bracket 4 of the scraper assembly includes a first clamping block 10 secured to the hub 5 of the gauge wheel arm. The first clamping block 10 is secured to the hub using a U-shaped clamping bolt 7 that extends around the outer surface of the hub 5 and passes through respective holes in the first clamping block 10. A pair of nuts 8 and a pair of lock nuts 9 are threaded onto the threaded ends of the U-shaped clamping bolt 7 to securely clamp the block 10 to the hub 5. A pair of pair of cone point set screws 6 can also be used to increase the stability of the first clamping block on the hub 5. When the set screws 6 are tightened, the pointed ends of the set screws 6 are embedded in the surface of the hub 5.

The scraper assembly includes a support rod 2 having a first end portion 2A and a second end portion 2B. In the illustrated embodiment, the first and second end portions 2A, 2B of the support rod 2 are spaced apart from each other and connected by an intermediate portion 2C extending between the first and second end portions 2A, 2B. The first end portion 2A has an axis that extends approximately parallel to the axes of the gauge wheel arm hub 5 and the gauge wheel W. The second end portion 2B has an axis that extends approximately perpendicular to and intersects with the axis of rotation of the gauge wheel W. The axis of the second end portion 2B extends along a radial line that intersects the axis of rotation of the gauge wheel W.

The first end portion 2A of the support rod 2 is attached to the first clamping block 10 of the mounting bracket 4. By attaching the support rod 2 and first clamping block 10 to the hub 5 of the gauge wheel arm, the support rod 2 will move with the gauge wheel arm when the gauge wheel arm pivots so that a constant engagement or close spacing can be maintained between the outer surface of the gauge wheel tire W and the scraper blade 1 of the scraper assembly.

The first clamping block 10 has a first bore extending therethrough for receiving the first end portion 2A of the support rod 2. A threaded fastener 11 extends through a second bore perpendicular to the first bore for clamping the first end portion 2A of the support rod 2 within the first bore of the first clamping block 10. The head of the threaded fastener 11 can be welded to the first clamping block 10. The first clamping block 10 has a split portion on one side to allow a clamping action upon tightening a lock nut 12 on the threaded fastener 11. The upper end of the support rod 2 can be adjusted rotationally and laterally relative to the first clamping block 10 until the lock nut 12 is tightened.

A clamp assembly 3 is used to attach the scraper blade 1 to the second end portion 2B of the support rod 2. The clamp assembly 3 includes a clamp structure clamped to the second end portion 2B of the support rod 2. The clamp structure has a second clamping block 13 with a first bore extending therethrough for receiving the second end portion 2B of the support rod 2. A threaded fastener 15 extends through a second bore perpendicular to the first bore for clamping the second clamping block 13 to the second end portion 2B of the support rod 2. The second clamping block 13 has a split portion provided on one side to allow a clamping action upon tightening the lock nut 14 on the threaded fastener 15. The clamp assembly 3 has a tightened condition (when the lock nut 14 is tightened) in which the clamp assembly 3 is fixed to the second end portion 2B of the support rod 2. The clamp assembly 3 has an adjustment condition (when the lock nut 14 is loosened) that allows sliding adjustment along the second end portion 2B of the support rod 2 and pivotal adjustment about the center axis of the second end portion 2B of the support rod 2.

A friction fit groove pin 16 (FIG. 6) extends radially from the second end portion 2B of the support rod 2 for limiting an extent of sliding adjustment along the support rod 2. The pin 16 prevents the second clamping block 13 from coming off of the support rod 2 before the lock nut 14 is tightened.

The scraper blade 1 is attached to the clamp structure using the same threaded fastener 15 used to clamp the second clamping block 13 to the second end portion 2B of the support rod 2. The threaded fastener 15 extends through a hole in the scraper blade 1, and the lock nut 14 is tightened to secure the scraper blade 1 to the second clamping block 13, while simultaneously clamping the second clamping block 13 to the second end portion 2B of the support rod 2. An internal/external-tooth lock washer 17 is provided on the threaded fastener 15 between the second clamping block 13 and the scraper blade 1 to lock the scraper blade 1 in position relative to the second clamping block 13 when the lock nut 14 is tightened on the threaded fastener 15.

The scraper blade 1 is a planar member formed of heat treated steel. The scraper blade 1 has first and second ends 1A, 1B, and a scraping edge 1C that extends between the first and second ends 1A, 1B. The scraping edge 1C is defined by a curved profile along the length of the scraper blade 1 that substantially matches an outer profile of the outer circumferential surface of the gauge wheel W when the scraper blade 1 is properly installed and adjusted. The top edge 1D will also preferably have a curved profile along its length that corresponds with the curved profile of the scraping edge 1C. This allows multiple scraper blades 1 to be cut from a sheet of metal with minimal waste between adjacent blades to improve manufacturing efficiencies.

Figure 1:
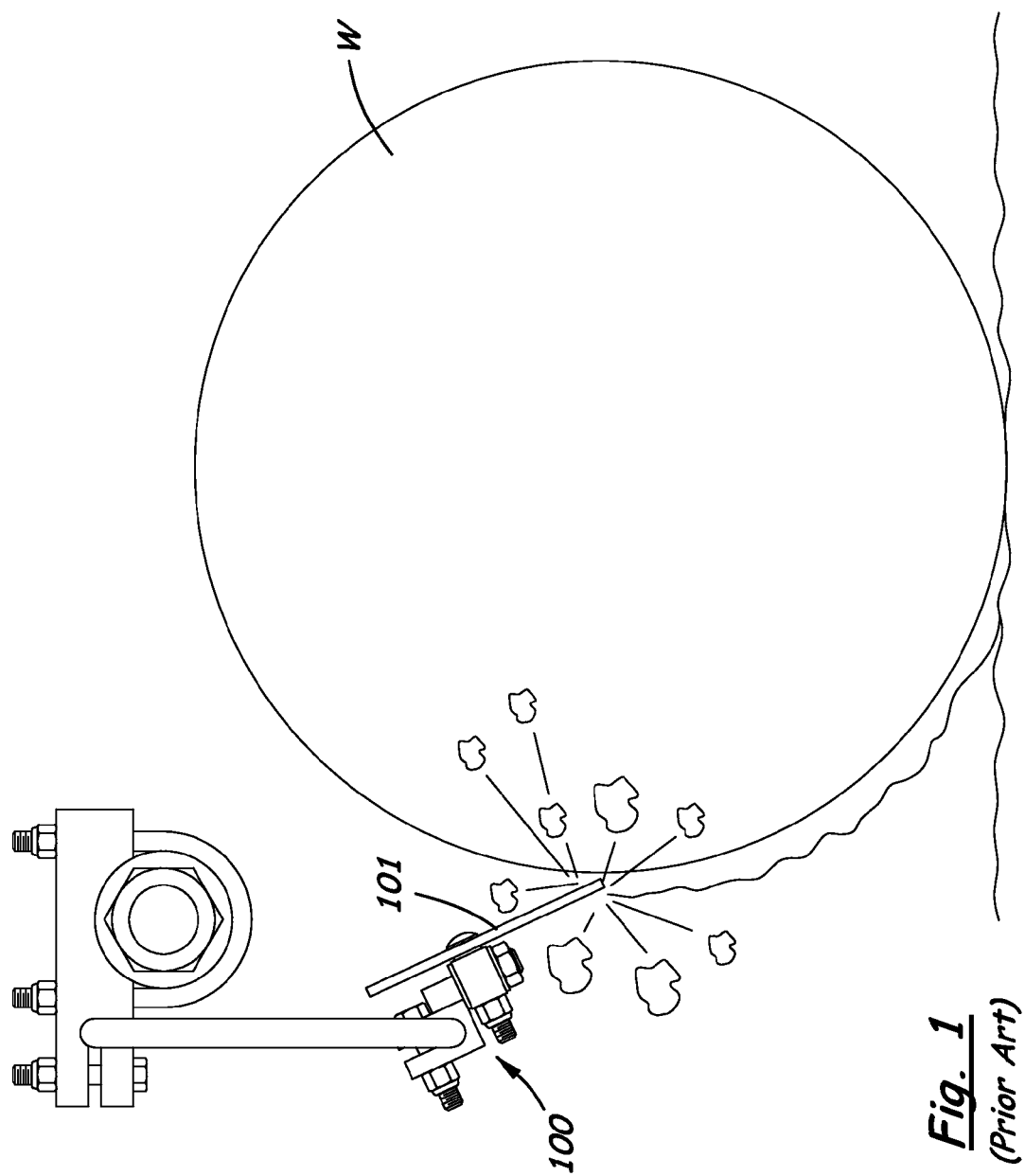
FIG. 1 is an elevation view of a prior art adjustable scraper blade system developed by the Applicant.
Figure 2:
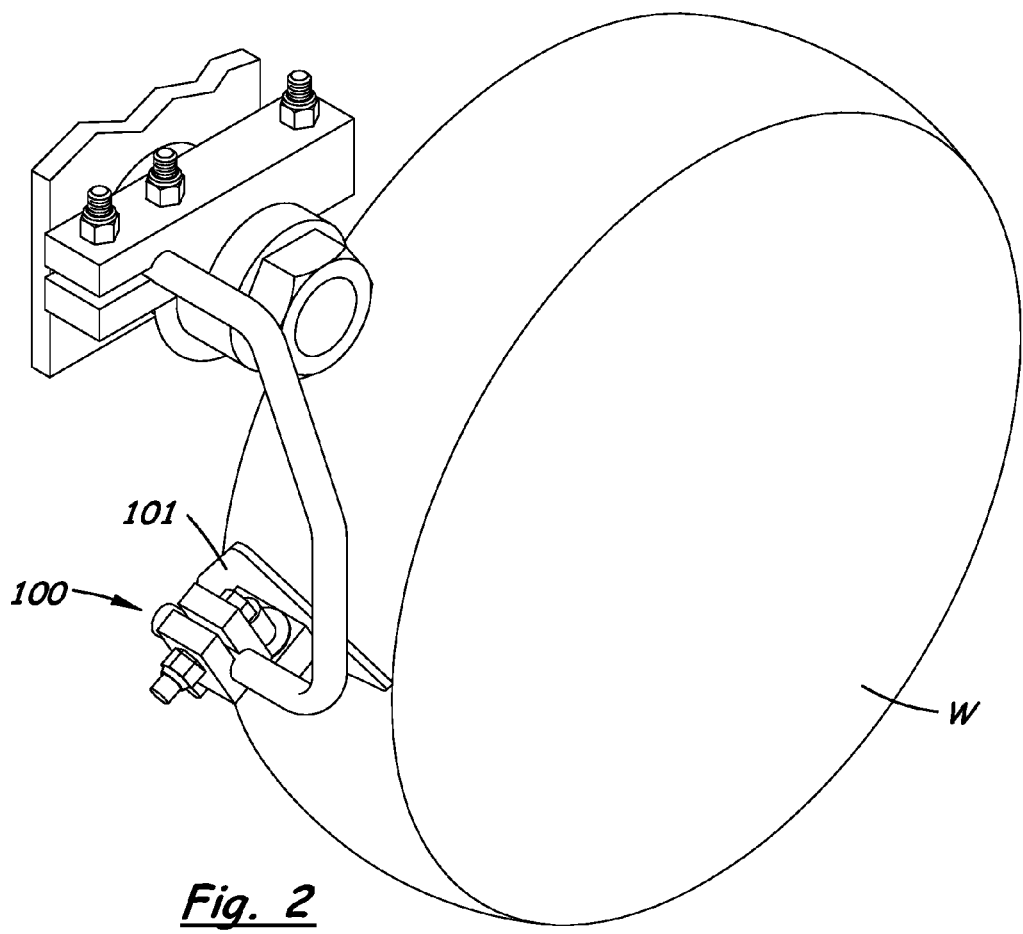
FIG. 2 is a perspective view of the prior art adjustable scraper blade system shown in FIG. 1.
Figure 3:
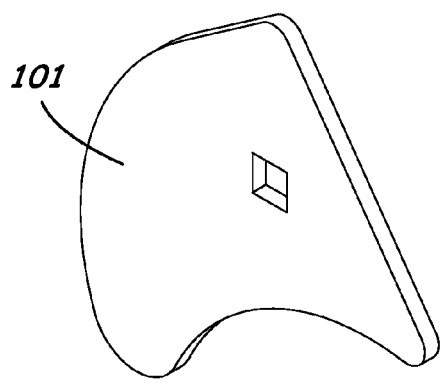
FIG. 3 is a perspective view of a scraper blade used with the prior art system shown in FIGS. 1 and 2.
Figure 4A:
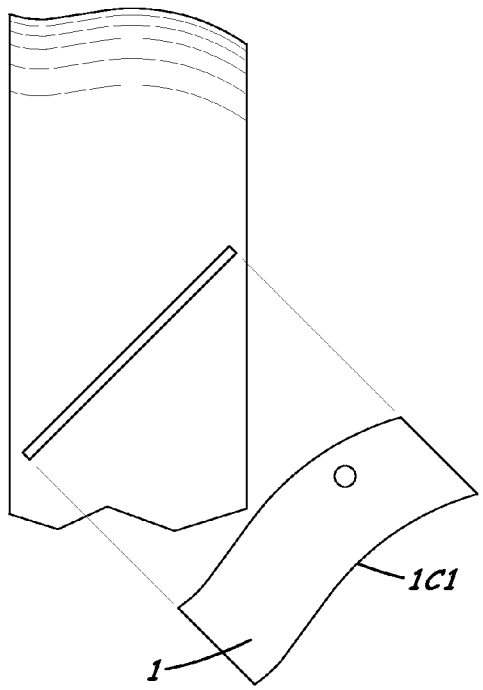
FIGS. 4(A) to 4(C) are illustrations that show three common gauge wheel tire profiles and the respective scraper blade shapes used in the gauge wheel scraper assembly of the present invention to accommodate each tire profile.
Figure 4B:
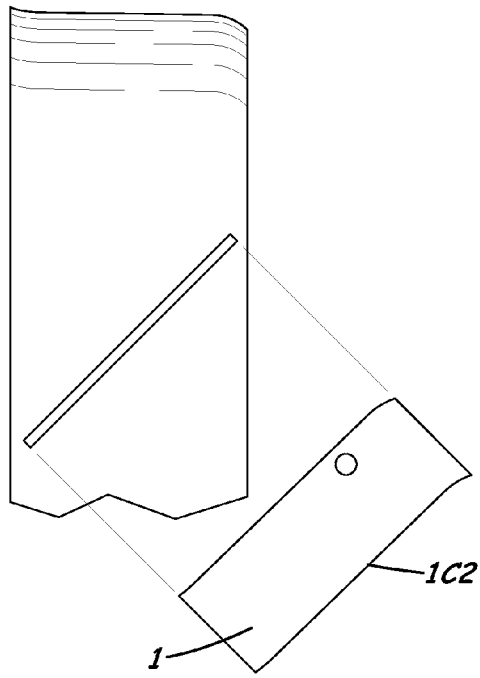
Figure 4C:
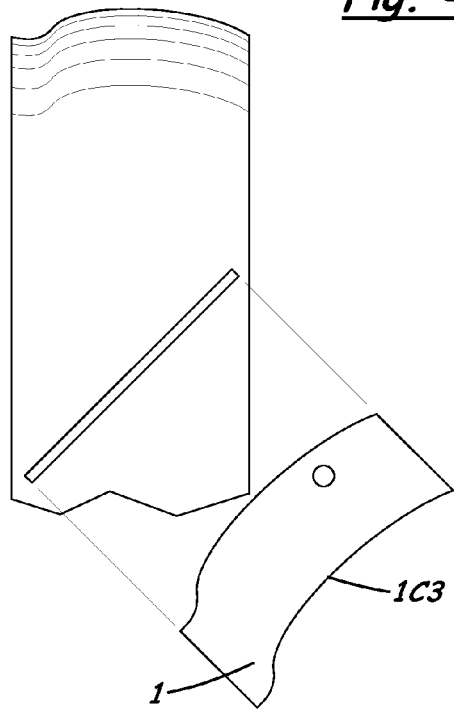

As illustrated in FIGS. 4A to 4C, the scraper blade 1 can be provided with different curved profiles to match the most common gauge wheel tire profiles. For example, scraper blades 1 having scraping edges $1C_1$ and $1C_3$ that match two of the most common tire profiles currently being manufactured are illustrated in FIGS. 4A and 4C, respectively, and a scraper blade 1 having a scraping edge $1C_2$ that matches a flatter profile tire used on older planters is illustrated in FIG. 4B.

As explained above, the second end portion 2B of the support rod is pointed at a center of the gauge wheel W (i.e., the axis of the second end portion 2B intersects with the gauge wheel axis). This arrangement holds the scraper blade 1 approximately perpendicular to the surface of the gauge wheel W at the center of the tire.

The scraper blade 1 is also positioned at an approximately 45 degree angle relative to the sides of the gauge wheel W. Stated another way, the plane containing the scraper blade 1 is angled approximately 45 degrees from a plane that contains the axis of rotation of the gauge wheel W and the axis of the second end portion 2B of the support rod 2. The plane of the scraper blade 1 passes through a center of the gauge wheel W. The intersection of the plane of the scraper blade 1 and the outer surface of the gauge wheel W establishes the optimum profile of the scraping edge 1C of the scraper blade 1. Once the scraper blade 1 is properly positioned, the first and second ends 1A, 1B of the scraper blade 1 are spaced axially apart and circumferentially offset from each other with respect to the outer surface of the gauge wheel W.

Because the optimum position of the scraper blade 1 is predetermined (i.e., 45 degree angle relative to the sides of the gauge wheel W), and the angle of the scraper blade 1 relative to the outer surface of the gauge wheel W is fixed by the support rod 2 (i.e., the scraper blade 1 is perpendicular to the gauge wheel surface at its center), adjusting the scraper blade 1 to match the outer surface of the gauge wheel W is extremely easy. With the lock nuts 12 and 14 snugged but loose enough to allow the adjustments indicated by arrows A, B, C, D and E in FIGS. 5 to 7, the installer merely has to position the blade 1 at the center of the gauge wheel W while holding it at an angle of approximately 45 degrees relative to the sides of the gauge wheel W and tight to the outer surface of the gauge wheel W. By adjusting this angle slightly, the installer can easily optimize the position of the scraper blade 1 before tightening the lock nuts 12 and 14.

The scraper blade assembly of the present invention provides a number of advantages over the prior art. For example, the scraper blade assembly is easier to install because the scraping edge 1C of the scraper blade 1 is designed to fit the profile of a specific gauge wheel tire, and the optimum position of the blade 1 relative to the tire is predetermined. The perpendicular position of the scraper blade 1 relative to the outer surface of the gauge wheel W is established by the support rod 2 and no adjustment of that angle is required. The 45 degree angle relative to the sides of the gauge wheel W is easily visualized by the installer and is easily established. This is an advantage over conventional scraper blades, which require the installer to search for an optimum position.

Another advantage is that the scraper blades 1 of the present invention fit the tire profile better, which results in less hair pinning and trash accumulation because void areas between the blade 1 and tire W are minimized.

Other advantages result from the 45 degree angle of the scraper blade 1. For example, the 45 degree angle makes the scraper blade assembly more tolerant of trash conditions in a field by giving the trash a better chance of clearing itself. The 45 degree angle also allows the scraper blade assembly to handle mud and other debris more efficiently.

Figure 8:
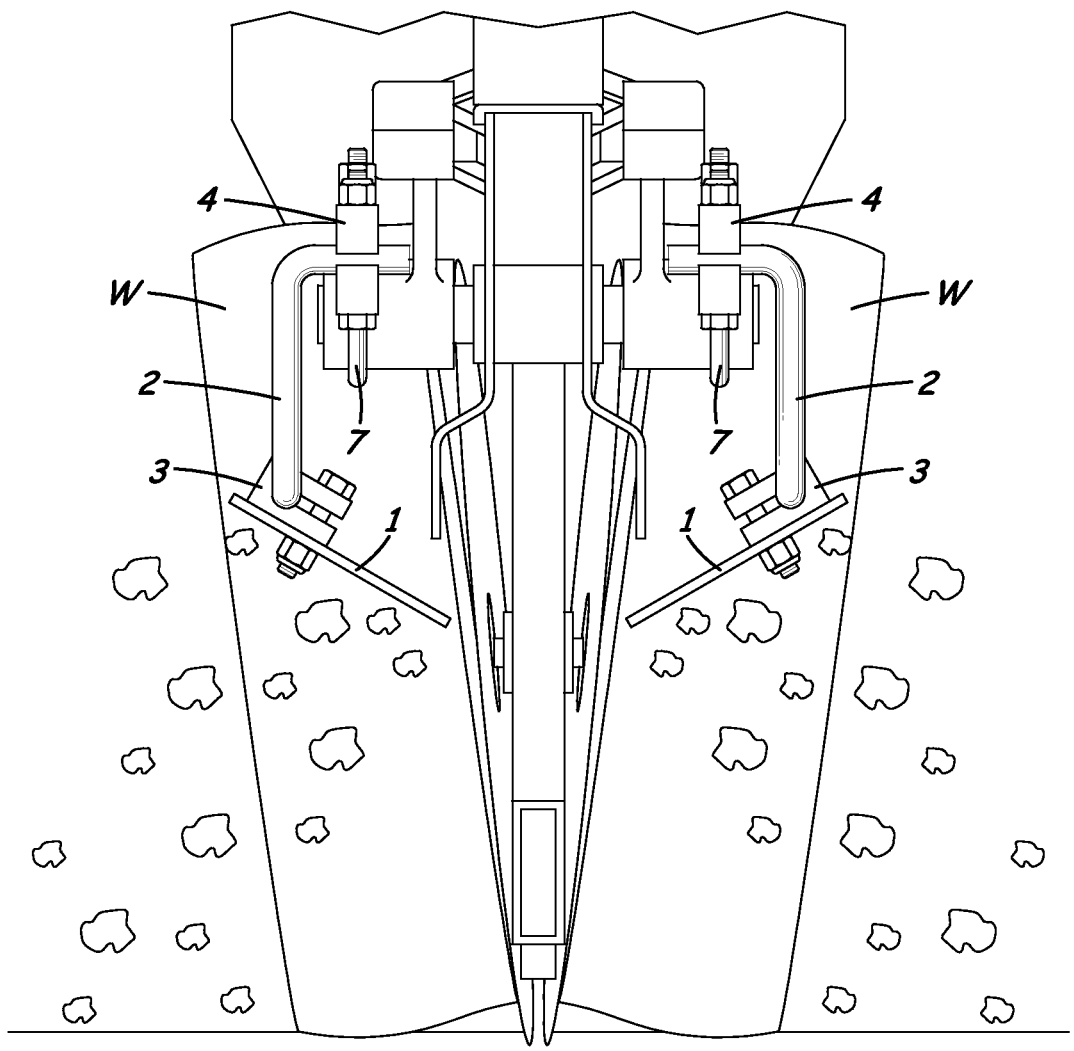
FIG. 8 is a rear view of a planter row unit equipped with a pair of gauge wheel scraper assemblies of the present invention.

FIG. 8 provides a rear view of a planter row unit showing a pair of scraper blades 1 arranged to scrape respective gauge wheels W on each side of the furrow opener. As seen in FIG. 8, the angle of the scraper blades 1 causes the scraper blades 1 to deflect the mud and debris scraped from the surface of the gauge wheels W outwardly away from the furrow and the path of the closing wheels.

Another advantage is that the scraper blade assembly of the present invention allows greater pressure to be applied between the tire surface and the blade 1 because the blade 1 is perpendicular to the surface of the tire W, which eliminates the possibility of the blade 1 gouging the tire W. Mounting the scraper blade 1 perpendicular to the gauge wheel W also improves the durability of the blade.

Another advantage is that the scraper blade assembly of the present invention requires less space, which permits the use of larger diameter spoked closing wheels and other attachments.

While the invention has been specifically described in connection with specific embodiments thereof, it is to be understood that this is by way of illustration and not of limitation, and the scope of the appended claims should be construed as broadly as the prior art will permit.

What is claimed is:

1. A scraper assembly in combination with a planter gauge wheel having an axis of rotation and an outer circumferential surface for engaging the ground, the scraper assembly comprising:
   a mounting bracket;
   a support rod having a first end portion attached to said mounting bracket and a second end portion having an axis that is approximately perpendicular to and intersects with the axis of rotation of the gauge wheel;
   a clamp structure attached to said second end portion of said support rod, said clamp structure having a tightened condition in which said clamp structure is fixed to said second end portion of said support rod and an adjustment condition in which said clamp structure is adjustable linearly along and rotatably about said second end portion of said support rod; and
   a scraper blade attached to said clamp structure by a fastener that allows pivotal adjustment about an axis of the fastener, said scraper blade having a scraping edge positioned close to or against the outer surface of the gauge wheel.

2. The combination according to claim 1, wherein said clamp structure comprises a clamping block having a bore extending therethrough for receiving the second end portion of the support rod, and said fastener comprises a threaded fastener used to clamp the clamping block to the support rod.

3. The combination according to claim 1, wherein said axis of said second end portion of the support rod extends along a radial line of said gauge wheel that intersects said axis of rotation of said gauge wheel.

4. The combination according to claim 1, wherein said scraping edge of said scraper blade has a curved profile along its length that substantially matches an outer profile of said outer circumferential surface of said gauge wheel when said scraper blade is properly adjusted.

5. The combination according to claim 1, wherein said gauge wheel has first and second sides, and wherein said scraper blade is a planar member positioned so that a plane of said scraper blade is angled approximately 45 degrees from said first and second sides of said gauge wheel.

6. The combination according to claim 1, wherein said scraper blade is positioned so that a plane that contains said scraper blade is angled approximately 45 degrees from a plane that contains the axis of rotation of said gauge wheel and the axis of said second end portion of said support rod.

7. The combination according to claim 1, wherein a plane of said scraper blade is angled approximately 45 degrees from the axis of rotation of said gauge wheel.

8. The combination according to claim 1, wherein said gauge wheel has first and second sides, and wherein said scraper blade is a planar member positioned so that a plane of said scraper blade is angled relative to the first and second sides of the gauge wheel to facilitate trash clearing between the outer surface of the gauge wheel and the scraper blade.

9. The combination according to claim 1, wherein a plane of said scraper blade is approximately perpendicular to the outer surface of the gauge wheel.

10. The combination according to claim 1, wherein said first end portion of said support rod has an axis that extends approximately parallel to said axis of rotation of said gauge wheel, and wherein said mounting bracket comprises a clamping block having a bore extending therethrough for receiving the first end portion of said support rod, and wherein said clamping block allows sliding adjustment of said first end portion of said support rod through said bore and pivotal adjustment of said first end portion of said support rod within said bore.

11. The combination according to claim 1, further comprising a friction fit pin extending radially from said second end portion of said support rod for limiting an extent of sliding adjustment of said clamp structure along said second end portion of said support rod.

12. The combination according to claim 1, wherein a plane of said scraper blade is approximately perpendicular to the outer surface of the gauge wheel, wherein said scraping edge has a first end positioned close to a first side edge of said gauge wheel and a second end positioned close to a second side edge of said gauge wheel, and wherein said first and second ends of the scraping edge are spaced axially and are circumferentially offset from each other with respect to said outer surface of said gauge wheel.

13. An agricultural planter, comprising:
   a planter frame;
   a gauge wheel arm having a hub pivotally attached to said planter frame;
   a gauge wheel assembly attached to said gauge wheel arm, said gauge wheel assembly comprising a gauge wheel having an axis of rotation, and an outer circumferential surface for engaging the ground; and
   an adjustable scraper assembly having a scraping edge positioned close to or against said outer surface of said gauge wheel, said adjustable scraper assembly comprising:
      a mounting bracket attached to said hub of said gauge wheel arm;
      a support rod having a first end portion attached to said mounting bracket and a second end portion located adjacent to said outer surface of said gauge wheel, said second end portion having an axis that extends approximately perpendicular to said axis of rotation of said gauge wheel;
      a clamp structure attached to said second end portion of said support rod;
      a scraper blade comprising said scraping edge attached to said clamp structure; and
      said clamp structure has a tightened condition in which said clamp structure is fixed to said second end portion of said support rod and an adjustment condition in which said clamp structure allows sliding adjustment along said support rod and pivotal adjustment about said support rod, and said scraper blade is attached to said clamp structure with a fastener that can be loosened to allow pivotal adjustment of said scraper blade about an axis of the fastener and tightened to fix said scraper blade relative to said clamp structure.

14. The agricultural planter according to claim 13, wherein said axis of said second end portion of the support rod extends along a radial line of said gauge wheel that intersects said axis of rotation of said gauge wheel.

15. The agricultural planter according to claim 13, wherein said scraping edge of said scraper blade has a curved profile along its length that substantially matches an outer profile of said outer circumferential surface of said gauge wheel when said scraper blade is properly adjusted.

16. The agricultural planter according to claim 13, wherein said gauge wheel has first and second sides, and wherein said scraper blade is a planar member positioned so that a plane of said scraper blade is angled approximately 45 degrees from said first and second sides of said gauge wheel.

17. The agricultural planter according to claim 13, wherein said scraper blade is positioned so that a plane that contains said scraper blade is angled approximately 45 degrees from a plane that contains the axis of rotation of said gauge wheel and the axis of said second end portion of said support rod.

18. The agricultural planter according to claim 13, wherein said scraper blade is positioned so that a plane of said scraper blade is angled approximately 45 degrees from the axis of rotation of said gauge wheel.

19. The agricultural planter according to claim 13, wherein said gauge wheel has first and second sides, and wherein said scraper blade is a planar member positioned so that a plane of said scraper blade is angled relative to the first and second sides of the gauge wheel to facilitate trash clearing between the outer surface of the gauge wheel and the scraper blade.

20. The agricultural planter according to claim 13, wherein a plane of said scraper blade is approximately perpendicular to the outer surface of the gauge wheel.

21. The agricultural planter according to claim 13, wherein said first end portion of said support rod has an axis that extends approximately parallel to an axis of rotation of said gauge wheel arm hub, and wherein said mounting bracket comprises a clamping block having a bore extending therethrough for receiving the first end portion of said support rod, and wherein said clamping block allows sliding adjustment along said first end portion of said support rod and pivotal adjustment about said first end portion of said support rod.

22. An agricultural planter, comprising:
a planter frame;
a furrow opener attached to the planter frame;
first and second gauge wheel arms having respective hubs pivotally attached to said planter frame;
first and second gauge wheel assemblies attached to said first and second gauge wheel arms, respectively, said gauge wheel assemblies comprising first and second gauge wheels positioned on opposite sides of said furrow opener, said first and second gauge wheels having respective axes of rotation and outer circumferential surfaces for engaging the ground; and
first and second adjustable scraper assemblies each having a scraping edge positioned close to or against an outer surface of a respective one of said first and second gauge wheels, said adjustable scraper assemblies each comprising:
a mounting bracket attached to said hub of said gauge wheel arm;
a support rod having a first end portion attached to said mounting bracket and a second end portion located adjacent to said outer surface of said gauge wheel, said second end portion having an axis that extends approximately perpendicular to said axis of rotation of said gauge wheel;
a clamp structure attached to said second end portion of said support rod;
a scraper blade comprising said scraping edge attached to said clamp structure; and
said clamp structure has a tightened condition in which said clamp structure is fixed to said second end portion of said support rod and an adjustment condition in which said clamp structure allows sliding adjustment along said support rod and pivotal adjustment about said support rod, and said scraper blade is attached to said clamp structure with a fastener that can be loosened to allow pivotal adjustment of said scraper blade about an axis of the fastener and tightened to fix said scraper blade relative to said clamp structure; and
said first and second scraper assemblies are positioned so that the scraping edges of said scraper blades are angled relative to said gauge wheels to deflect material scraped from the outer surfaces of the gauge wheels outwardly away from a furrow created by said furrow opener.

* * * * *